(12) United States Patent
Mengle

(10) Patent No.: US 6,895,130 B1
(45) Date of Patent: May 17, 2005

(54) TRUE POSITION SENSOR FOR DIAPHRAGM VALVES USING REFLECTED LIGHT PROPERTY VARIATION

(76) Inventor: Tobi Mengle, 931 Lincoln Rd., Birdsboro, PA (US) 19508

(*) Notice: Subject to any disclaimer, the term of this patent is extended or adjusted under 35 U.S.C. 154(b) by 163 days.

(21) Appl. No.: 10/357,799

(22) Filed: Feb. 4, 2003

Related U.S. Application Data

(60) Provisional application No. 60/355,748, filed on Feb. 12, 2002.

(51) Int. Cl.$^7$ .............................. G02B 6/00; G01J 5/08
(52) U.S. Cl. .................................... 385/12; 250/227.11
(58) Field of Search ........... 385/12; 250/227.11–227.32

(56) References Cited

U.S. PATENT DOCUMENTS

| | | | |
|---|---|---|---|
| 4,178,954 A | 12/1979 | Klieves | |
| 4,284,212 A | 8/1981 | Caswell | |
| 4,540,020 A | 9/1985 | Taplin | |
| 4,637,431 A | 1/1987 | Taplin | |
| 5,027,693 A | 7/1991 | Wilkinson | |
| 5,031,841 A | 7/1991 | Schafer | |
| 5,238,024 A | 8/1993 | Taylor | |
| 5,331,152 A | * 7/1994 | Fenton | 250/227.11 |
| 5,518,015 A | 5/1996 | Berget et al. | |
| 5,647,397 A | 7/1997 | Heiniger | |
| 5,685,336 A | 11/1997 | Heiniger | |
| 5,711,507 A | 1/1998 | Berget et al. | |
| 5,836,346 A | 11/1998 | Nichols-Ray | |
| 5,924,441 A | 7/1999 | Leys et al. | |
| 6,042,081 A | 3/2000 | Anderson | |

* cited by examiner

*Primary Examiner*—John D. Lee
*Assistant Examiner*—Tina M Lin

(57) ABSTRACT

An arrangement for measuring the true position of a diaphragm within a diaphragm valve assembly utilizes an optical probe in conjunction with a reflective surface formed on the backside of the diaphragm membrane. An optical test signal is launched from a source (such as an LED or laser) along a waveguide (such as an optical fiber) so as to impinge upon the reflective surface of the membrane. The reflected test signal is then coupled back into the waveguide and directed toward an optical receiving device. The received optical signal is translated into an electrical signal that is used as an indication of the "state" of the diaphragm. That is, as the diaphragm membrane moves between the "open" and "closed" position, the membrane surface will be deformed and thus modify the amount of reflected optical signal that is directed back into the probe. Therefore, the true position of the diaphragm can be determined by monitoring the generated electrical signal from the optical probe. Position values between the "open" and "closed" positions can also be determined, as well as the fluid pressure on the process side of the diaphragm.

10 Claims, 3 Drawing Sheets

US 6,895,130 B1

TRUE POSITION SENSOR FOR DIAPHRAGM VALVES USING REFLECTED LIGHT PROPERTY VARIATION

CROSS-REFERENCE TO RELATED APPLICATION

This application claims the benefit of Provisional Application No. 60/355,748, filed Feb. 12, 2002.

TECHNICAL FIELD

The present invention relates to a true position sensor for diaphragm valves and, more particularly, to the utilization of an optical probe and associated reflective diaphragm surface element to determine the true position of the diaphragm within the valve assembly.

BACKGROUND OF THE INVENTION

Diaphragm valves are used extensively within the process industry and particularly within the biopharmaceutical process industry to control fluid flow for high purity water, steam and other process fluids. The diaphragm valve is the valve of choice since the design ensures minimal areas for trapped fluid, is freely drainable, and is easily cleaned. The typical design comprises a stainless steel valve body with two wells for the fluid inlet and outlet, similar to a double bowl kitchen sink. The diaphragm is typically a flat elastomer plate that seals against the top edge of the wall between the two wells when the valve is closed, and is lifted away from the top edge of the wall when the valve is open, so as to allow fluid to flow between the wells. An actuator, typically a compressed air operated piston, moves the diaphragm away from the valve body to open the valve, and a spring mechanism forces the diaphragm back against the valve body when the opening force is removed. The diaphragm is typically connected to the actuator with a threaded stud that screws into one end of a rod that is moved by the air-operated piston. The other end of the actuator rod protrudes out the top of the actuator when the valve is open, and retracts into the actuator when the valve is closed, to be used as an external visual indication of the state of the valve. A limit switch assembly is often attached to the top of the actuator and uses a cam rod that threads into the top of the actuator rod and moves with the actuator to activate switches that provide control systems with an electrical indication of the valve position.

With the critical importance of consistent control over, for example, pharmaceutical manufacturing, many of the diaphragm valves used are computer controlled and monitored. The typical method of monitoring the position of a diaphragm valve is using the limit switch assembly described above. However, a proven problem with the limit switch assemblies is that they indicate the position of the actuator rod, and not necessarily the true position of the diaphragm. Since the diaphragm is connected to the actuator rod by a threaded stud or other suitable mechanical attachment, the diaphragm can be mis-assembled or become separated from the actuator rod with no visible indication of any problem. In this case, the computer control system can command the valve to open and receive feedback from the limit switch that the valve is open, when in fact the diaphragm is still in the closed position.

Another problem with prior art limit switch indicators is that they must periodically be adjusted to correctly indicate the actuator position. This is both an extra step during the manufacturing process, as well as a continuing maintenance issue. Moreover, state-of-the-art limit switch assemblies have no way of indicating the presences of fluid within the valve body.

Thus, a variety of needs remain in the art for a diaphragm valve arrangement that can more accurately indicate the proper position and status of the diaphragm within the valve assembly.

SUMMARY OF THE INVENTION

The need remaining in the prior art is addressed by the present invention, which relates to a true position sensor for diaphragm valves and, more particularly, to the utilization of an optical probe and associated reflective diaphragm surface element to determine the true position of the diaphragm within the valve assembly.

In accordance with the present invention, a reflective element is disposed in at least one location on the back surface of a diaphragm membrane within a valve assembly. An optical fiber, waveguide, or other light propagating medium is disposed in relation to the reflective element such that a light beam can be launched into the fiber, reflect off of the diaphragm reflective element and be re-directed back along the fiber and into a sensor element (for example, a PIN photodiode). As the diaphragm moves within the assembly, the angular relationship between the reflective element and the optical probe will change, thus changing the amount of optical signal coupled back into the fiber. A measurement of the electrical output from the sensor element is then indicative of the position of the diaphragm vis-à-vis the valve assembly.

In one embodiment of the present invention, a conventional optical fiber is inserted through a pre-existing opening in the valve actuator, where the opposite end of the fiber is then coupled to an external sensor assembly. In an alternative embodiment, the light source and detector may be included within the valve assembly housing, with an external lead used to provide the output control measurement signal. Any appropriate optical source, such as a laser or LED, may be used to provide the input optical signal.

In another embodiment, light of different wavelengths may be used to allow for the detection of other valve properties. For example, an infra-red signal may be used to measure/sense the temperature or change in temperature of the diaphragm.

Other and further embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
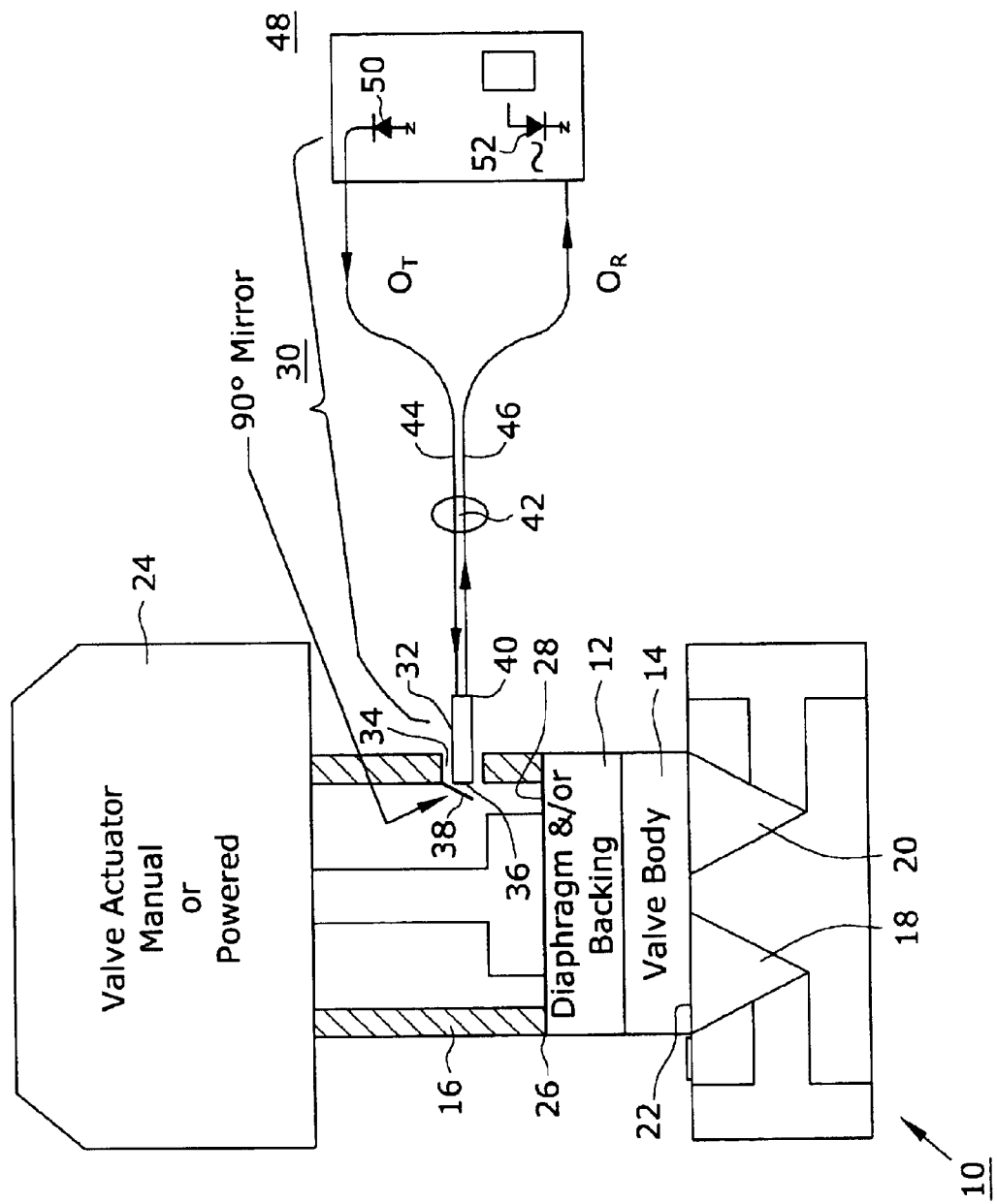
FIG. 1 contains an exemplary embodiment of the optically-measured diaphragm position sensor formed in accordance with the present invention, the diaphragm being illustrated in the fully "closed" position.

FIG. 1, illustrates, in a simplified view, an exemplary diaphragm valve 10 including an optically-controlled position sensor formed in accordance with the present invention. Diaphragm valve 10 includes a conventional diaphragm membrane 12, which comprises a flexible lightweight material, such as a Teflon® elastomer. Diaphragm membrane 12 is connected to a valve body 14 using a suitable attachment arrangement, such as two or more assembly bolts 16. Shown within valve body 14 is a pair of reservoirs 18 and 20, where the position of diaphragm membrane 12 with respect to top surface 22 of reservoirs 18 and 20 will either prevent the flow of liquid from one reservoir to the other (the "closed position"), or permit the flow of liquid (the "open" position) (see FIG. 2). A diaphragm actuator 24 is used to control the position of diaphragm membrane 12 and, as shown, can be attached to both membrane 12 and body 14 using the same assembly bolts 16. A section of diaphragm backing material 26 is considered optional, and may be used to prevent contact between membrane 12 and actuator 24.

In accordance with the present invention, a portion of backing material 26 (or the back surface of membrane 12 if backing material is not used) is covered with a reflective material 28 and used in conjunction with an optical probe 30 to provide the true position sensing function. Reflective material 28 may simply be a coating applied to the surface of backing material 26 (or membrane 12), or may comprise a separate reflective element attached to backing material 26 (or membrane 12). In the particular arrangement as shown in FIG. 1, optical probe 30 comprises an optical termination 32 (such as, for example, a fiber stub or waveguide section) disposed through an aperture 34 in diaphragm actuator 24. As will be described in detail below, a first end 36 of termination 32 is disposed to capture, via a turning mirror 38, a light signal reflected off of reflective element 28 of diaphragm membrane 12. The opposing, second end 40 of termination 32 is coupled to an optical waveguide 42 (in this case, a pair of optical fibers 44 and 46), where optical waveguide 42 is coupled to a sensor circuit 48 that functions to launch an optical position sensing signal into waveguide 42, as well as receive the return, reflected optical signal and transform the optical signal into an electrical equivalent, the electrical output signal used as the indicator of the "true position" of diaphragm 12 within valve 10.

In the particular arrangement as shown in FIG. 1, sensor circuit 48 comprises a light source 50 (which may be, for example, an LED or laser) which is used to launch an optical test signal $O_T$ along fiber 44 and into optical termination 34 such that signal $O_T$ reflects off of turning mirror 38 and onto reflective element 28. The reflected optical signal $O_R$ from element 28 then reflects from turning mirror 38 and is coupled into optical termination 34. Reflected signal $O_R$ is then coupled into return fiber 46 (or any appropriate return waveguiding medium) and applied as a received signal to sensor circuit 48. In particular, the received optical signal $O_R$ impinges on a photosensor 52 (which may comprise, for example, a conventional photodiode), which then generates an electrical equivalent in terms of voltage (VDC), where the voltage level is used in accordance with the present invention as the indicator of the position of diaphragm 12 with respect to reservoirs 18, 20.

Figure 2:
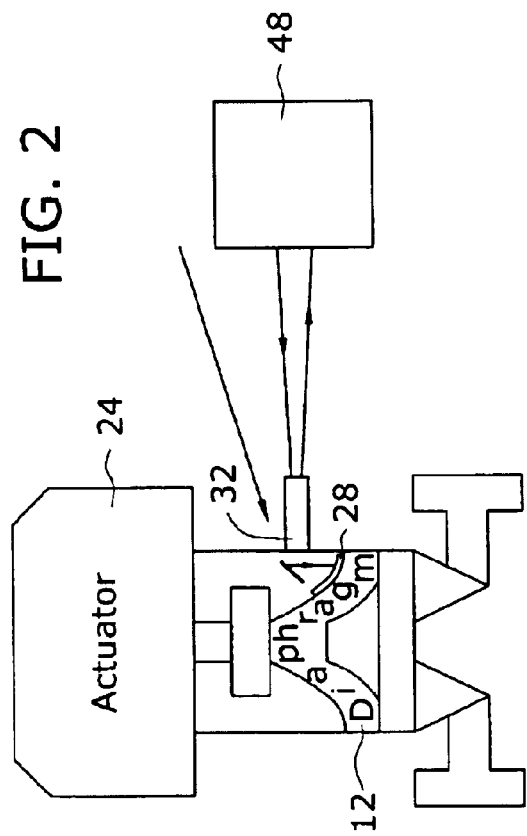
FIG. 2 contains an exemplary embodiment of the optical diaphragm position sensor formed in accordance with the present invention, the diaphragm being illustrated in the "open" position.

In the view of FIG. 1, diaphragm 12 is illustrated in the "closed" position. Thus, essentially all of the optical test signal $O_T$ will be reflected off of reflective element 28 of diaphragm 12 and coupled back into return fiber 46. As diaphragm 12 is moved into the "open" position, reflective element 28 will raise up toward actuator 24 and thus introduce an angular deflection into the returned test signal $O_R$ and reduce the amount of return signal coupled back into return fiber 46. FIG. 2 illustrates this principle of the present invention, which shows diaphragm 12 in its "open" position. It is clear that as diaphragm 12 moves upward, a smaller portion of return test signal $O_R$ will impinge on turning mirror 38. Thus, the output voltage generated by sensor circuit 48 will increase as diaphragm 12 moves from its "closed" to "open" position. The electrical current passed by photosensor 52 is directly proportional to the incident optical signal, therefore, the voltage across photosensor 52 is inversely proportional to the incident optical signal.

Figure 3:
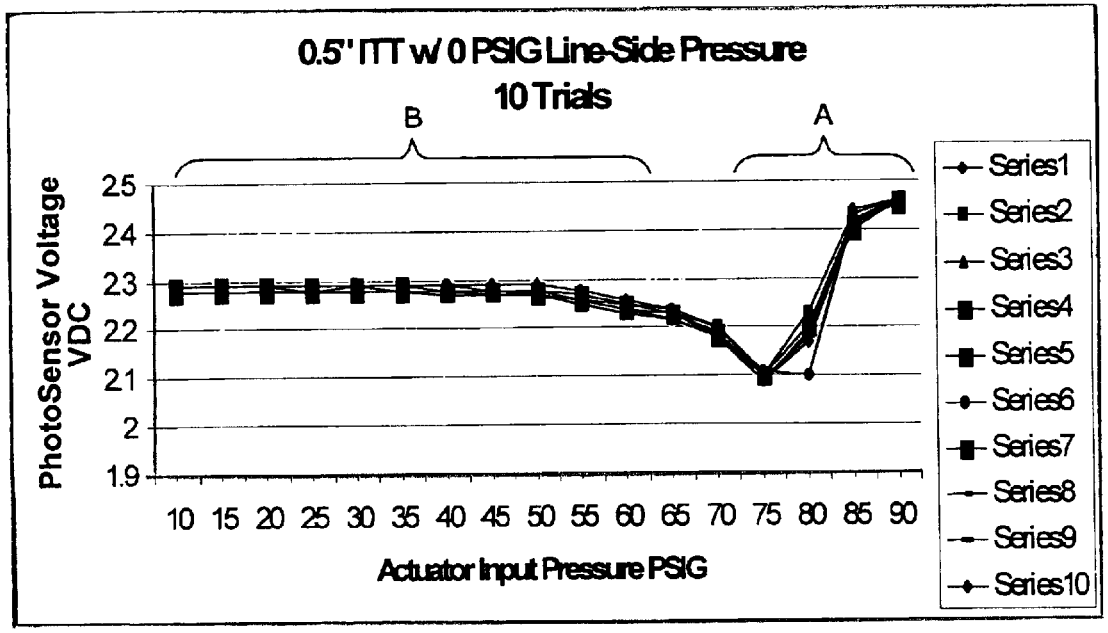
FIG. 3 is a graph illustrating the principles of the present invention, plotting the output voltage from the position sensor arrangement as a function of actuator input pressure.

FIG. 3 contains a graph illustrating this principle of the present invention, where the graph plots the photosensor voltage generated by sensing circuit 48 as the input pressure applied by actuator 38 is changed. The "membrane motion" portion of the graph (labeled as portion "A"), from 75 to 90 SPIG input pressure, represents the photosensor response when the valve membrane is actually moving from the "closed" to the "open" position within the valve assembly. The remaining portion of the graph from 10 to 75 PSIG (labeled as portion "B"), represents the limited response while pressure increases against the actuator closing spring.

Figure 4:
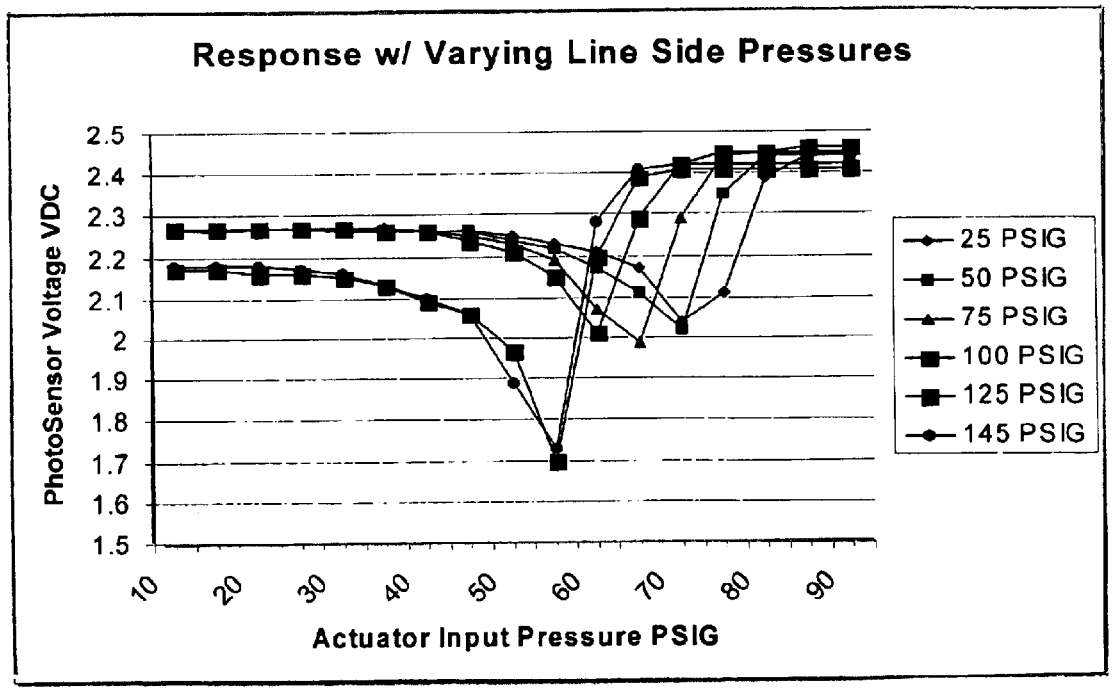
FIG. 4 is a graph illustrating the principles of the present invention, plotting the output voltage from the position sensor arrangement as a function of actuator input pressure, as measured at various line-side pressures.

The pressure on the process (also referred to as "line") side (i.e., valve body 22) of membrane 12 influences the response curve of the photosensor because the line side pressure works with the actuator input pressure to open the valve. FIG. 3 depicts the photosensor response curve with 0 PSIG line side pressure. FIG. 4 depicts the photosensor response curve with varying line side pressures. It is evident from both FIGS. 3 and 4 that as the line side pressure increases, the "membrane motion" portion of the response curve moves to lower actuator input pressures due to the assist from the line side pressure. The sensing electronics can therefore use the photosensor response curves in conjunction with a measurement of the actuator input pressure to provide an indication of the line side (process) pressure.

Figure 5:
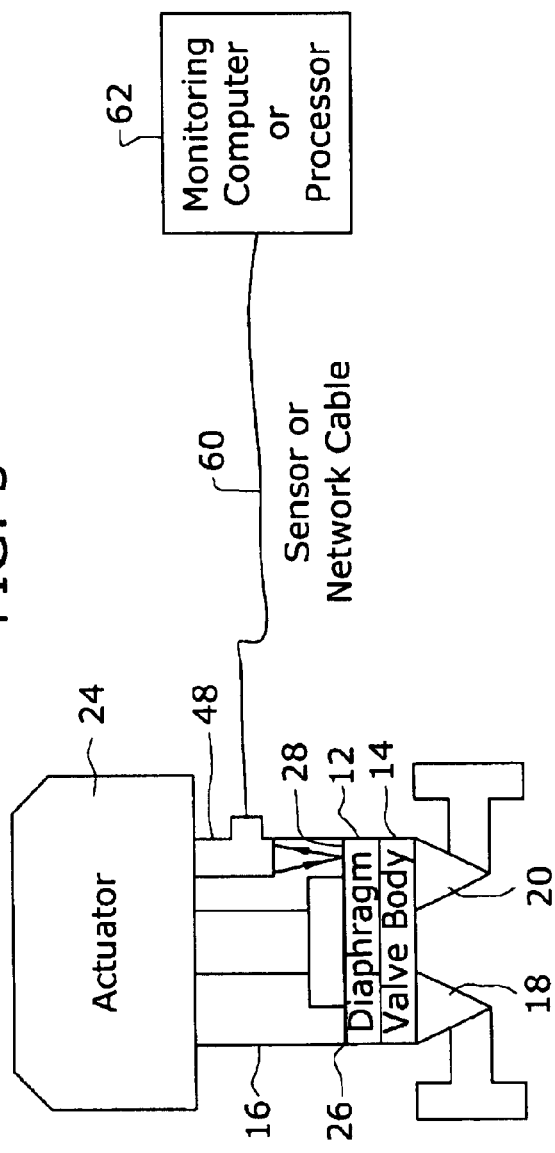
FIG. 5 illustrates an alternative embodiment of the present invention, where the inventive optical probe is formed within the actuator housing so as to be integral with the valve.

As mentioned above, the light source and sensor electronics of the present invention may be directly incorporated within the valve, as shown in FIG. 5. In this case, an external cable 60 carrying an electronic or optical representation of the generated voltage (VDC) from photosensor 52 can be coupled to an external monitoring device 62 to provide the indicated measurement. Alternatively, a display (not shown) may be incorporated directly on actuator 24 to illustrate the position of diaphragm 12.

Moreover, the optical probe arrangement of the present invention may be used, as mentioned above, to measure various other valve properties or conditions. For example, if the membrane develops leak, some of the fluid from reservoirs 18/20 would cover reflective element 28 and thus modify the properties of the reflected signal $O_R$—signaling to a technician that the valve is not operating properly. Alternatively, an infra-red input optical probe signal may be used to measure the temperature (or change in temperature) of the diaphragm membrane.

It sill be obvious to those skilled in the art that many modifications and variations may be made to the various embodiments described above without departing from the novel teachings of the present invention. All such modifications and variations are intended to be incorporated herein and within the scope of the present invention, as set forth in the following claims.

What is claimed is:

1. An arrangement for measuring the true position of a diaphragm membrane within a diaphragm valve, said diaphragm valve including a valve body having at least a pair of reservoirs controlled by said diaphragm membrane and an actuator for moving said membrane between an open position and it closed position, the arrangement comprising a reflective element disposed on the backside of the diaphragm membrane;

an optical probe including an optical transmitting device, an optical receiving device and an optical waveguide, said waveguide for launching an optical test signal from said optical transmitting device onto the reflective element and receiving therefrom a reflected optical test signal, said reflected optical test signal thereafter coupled into the optical receiving device, wherein the optical power of the reflected signal coupled into the waveguide is proportional to the position of the diaphragm membrane; and a sensing circuit coupled to the optical receiving device for converting the received, reflected optical signal into an electrical equivalent and, in conjunction with a measurement of the actuator input pressure, determining the pressure on the process side of said diaphragm as a function of the electrical representation equivalent.

2. The arrangement as defined in claim 1 wherein the optical probe waveguide comprises a pair of optical fibers, a first fiber of said pair of fibers used to launch the test optical signal from the optical transmitting device and a second, remaining fiber of said pair of fibers used to receive the reflected optical test signal from the diaphragm membrane.

3. The arrangement as defined in claim 1 wherein the probe waveguide further comprises a waveguide termination element disposed between the pair of fibers and the diaphragm membrane.

4. The arrangement as defined in claim 1 wherein the reflective element comprises a reflective surface area formed directly on the backside of the diaphragm membrane.

5. The arrangement as defined in claim 1 wherein the reflective element comprises a separate element attached to the backside of the diaphragm membrane.

6. The arrangement as defined in claim 1 wherein the optical probe is disposed within a housing also enclosing the valve.

7. The arrangement as defined in claim 1 wherein the optical probe utilizes a wavelength suitable to indicate temperature changes in the diaphragm membrane.

8. The arrangement as defined in claim 1 wherein the optical transmitting device comprises an LED.

9. The arrangement as defined in claim 1 wherein the optical transmitting device comprises a laser.

10. The arrangement as defined in claim 1 wherein the optical receiving device comprises a photodiode.

* * * * *